(12) United States Patent
Cella et al.

(10) Patent No.: US 7,166,244 B2
(45) Date of Patent: Jan. 23, 2007

(54) THERMALLY CROSSLINKED POLYMERS

(75) Inventors: James Anthony Cella, Clifton Park, NY (US); Rachid Kerboua, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/189,911

(22) Filed: Jul. 26, 2005

(65) Prior Publication Data

US 2005/0258407 A1 Nov. 24, 2005

Related U.S. Application Data

(62) Division of application No. 10/437,278, filed on May 12, 2003.

(51) Int. Cl.
*C08K 5/15* (2006.01)
(52) U.S. Cl. ...................... 252/582; 524/107
(58) Field of Classification Search ............... 252/589; 524/107
See application file for complete search history.

(56) References Cited

U.S. PATENT DOCUMENTS

| | | | | |
|---|---|---|---|---|
| 5,156,918 | A | * | 10/1992 | Marks et al. ............ 428/447 |
| 6,033,774 | A | * | 3/2000 | Yitzchaik et al. ........ 428/333 |
| 6,067,186 | A | | 5/2000 | Dalton et al. |
| 6,252,557 | B1 | | 6/2001 | Plugge et al. |

OTHER PUBLICATIONS

ATI 2001 d. e. Apec (PC-HT) Product Range. Reference Data, Processing Brochure by Bayer (2001).

Dalton et al., "The role of London forces in defining noncentrosymmetric order of high dipole moment-high hyperpolarizability chromophores in electrically poled polymetric thin films," *PNAS*, 94:4842-4847 (1997).

He et al., "Synthesis of Chromophores with Extremely High Electro-Optic Activity. 1. Thiophene-Bridge-Based Chromophores." *Chemistry of Materials*, 14:4662-4668 (2002).

Lewis et al., "Synthesis and Activity of Pt Catalysts Used in the Silicones Industry", GE Research & Development Center, 96CRO171, Dec. 1996, Class 1.

Shi et al., "Low (Sub-1-Volt) Hallwave Voltage Polymeric Electro-optic Modulators Achieved by Controlling Chromophore Shape." *Science*, 288(5463):119-122 (2000).

Wang et al., "Design, Synthesis and Characterization of A Novel Substituted Dicyanomethylendihydrofuran Based High-β NLO Chromophore and Its Polymers with Exceptionally High Electro-Optic Coefficients." Polym. Prepr., 39(2):1065-1066 (1998).

* cited by examiner

*Primary Examiner*—Robert D. Harlan
(74) *Attorney, Agent, or Firm*—Andrew J. Caruso; William E. Powell, III

(57) ABSTRACT

Crosslinking between polymer chains having olefin groups occurs by heating the polymer chains in the presence of a catalyst. Mixtures of polymer and catalyst can be dried and cast into films at ambient temperatures and remain non-crosslinked and soluble for extended periods. However, upon heating of the polymer to temperatures of about 300° C. or greater in the presence of a catalyst, the polymer chains of the film are cured to produce an insoluble crosslinked matrix. The sudden and relatively complete nature of the crosslinking between the polymers under specific conditions is particularly useful to allow chromophores poled in a noncrosslinked polymer mixture to retain their uniform orientation after crosslinking has occurred.

5 Claims, 3 Drawing Sheets

THERMALLY CROSSLINKED POLYMERS

This application is a divisional of 10/437,278 filed May 12, 2003.

BACKGROUND OF THE INVENTION

Electro-optical waveguides based on poled nonlinear optical (NLO) chromophore-polymer composites exhibit limited functionality when the uniform chromophore alignment achieved by poling is gradually lost due to a variety of relaxation processes attributed to the thermoplastic matrix. One approach to ameliorating this deficiency is to crosslink the polymer matrix after poling to "fix" the chromophore orientation. Various resins and crosslinking schemes have been developed with the aim of effecting an "on demand" cure triggered either thermally or by some other means after an initial processing step.

There are, however, a number of difficulties in effecting this transformation. First, the crosslinking reaction must not occur before or during poling, which is usually conducted at a temperature just above the glass transition temperature ($T_g$) of the polymer matrix. After poling, the crosslinking must be initiated either by raising the temperature or by some other form of initiation. Such a "command cure" feature is not easily accomplished.

A second difficulty in effecting an on demand cure by thermal or other means is that the crosslinking reaction of the polymer must be compatible with the NLO chromophore functionality. In particular, the dyes comprising NLO chromophores are generally highly conjugated molecules bearing both electron donor and electron acceptor functional groups. The complexity of these dyes thus renders them susceptible to undesirable side reactions. Conditions of most known thermally or photochemically-induced crosslinking reactions may undesirably give rise to reactions which alter the structure of the chromophore itself.

Therefore, there is a need in the art for polymer materials which exhibit complete crosslinking under sharply defined and relatively low temperature conditions.

BRIEF SUMMARY OF THE INVENTION

Crosslinking between polymer chains having an olefin group occurs by heating the polymer chains in the presence of a catalyst. Mixtures of polymer and catalyst can be dried and cast into films at ambient temperatures and remain non-crosslinked and soluble for extended periods. However, upon heating of the polymer to temperatures of 300° C. or greater in the presence of a catalyst, the polymer chains of the film are cured to produce an insoluble crosslinked matrix. The sudden and relatively complete nature of the crosslinking between the polymers under specific conditions is particularly useful to allow chromophores poled in a noncrosslinked polymer mixture to retain their uniform orientation after crosslinking has occurred.

An embodiment of a method of causing crosslinking in accordance with the present invention comprises providing a polymer including an olefin group, providing a catalyst in contact with the polymer, and heating the polymer and the catalyst to cause a cross-linking reaction involving the olefin group.

An embodiment of a method of fixing an alignment of a chromophore within a polymer matrix comprises providing a chromophore within a mixture including a catalyst and a polymer chain having an olefin group, poling the chromophore to establish an alignment, and heating the mixture to cause reaction of the olefin group to fix the alignment of the poled chromophore.

An embodiment of a crosslinked polymer matrix in accordance with the present invention comprises polymer chains including an olefin group, a cross-link structure resulting from a reaction of the olefin group at a temperature of 300° C. or greater, and a plurality of poled NLO chromophores fixed within the matrix.

These and other embodiments of the present invention, as well as its features and some potential advantages are described in more detail in conjunction with the text below and attached figures.

DETAILED DESCRIPTION OF THE INVENTION

Crosslinking between polymer chains having an olefin group occurs by heating the polymer chains in the presence of a catalyst. Mixtures of polymer and catalyst can be dried and cast into films at ambient temperatures and remain non-crosslinked and soluble for extended periods. However, upon heating of the polymer to temperatures of 300° C. or greater in the presence of a catalyst, the polymer chains of the film are cured to produce an insoluble crosslinked matrix. The sudden and relatively complete nature of the crosslinking between the polymers under specific conditions is particularly useful to allow chromophores poled in a noncrosslinked polymer mixture to retain their uniform orientation after crosslinking has occurred.

Figure 1:
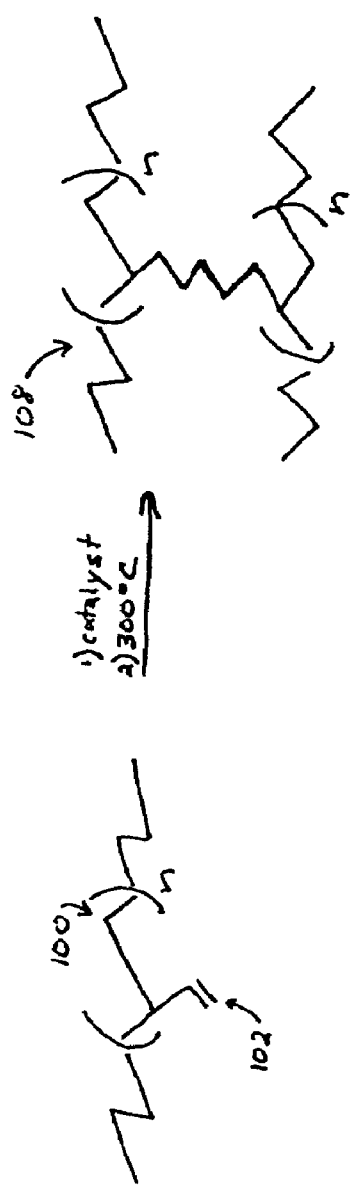
FIG. 1 is a generic depiction of one possible cross-linking reaction in accordance with an embodiment of the present invention.

FIG. 1 shows a generic depiction of one possible cross-linking reaction in accordance with one embodiment of the present invention. Polymer chain 100 bearing olefin side group 102 is mixed at a first temperature with a catalyst 108 reactive with the olefin group. The catalyst may be present at concentrations of between about 1 ppm to about 500 ppm or greater. Under these initial conditions, the polymer does not experience crosslinking over prolonged periods of time.

However, upon heating the polymer chain 100, FIG. 1 shows that a sudden and relatively complete catalyzed chemical reaction occurs involving the olefin group, resulting in formation of cross-linked material 108. The specific cross-linked structure of FIG. 1 represents just one possible result of the cross-linking reaction. The transition resulting in the crosslinking reaction is sharp and highly defined, based upon the temperature and/or concentration of the catalyst.

EXAMPLE

The following example provides specific conditions leading to formation of crosslinked polymer materials in accordance with specific embodiments of the present invention.

However, the reactants and reaction conditions described are exemplary only, and the present invention should not be interpreted as being limited to these particular reactants or conditions.

Figure 2:
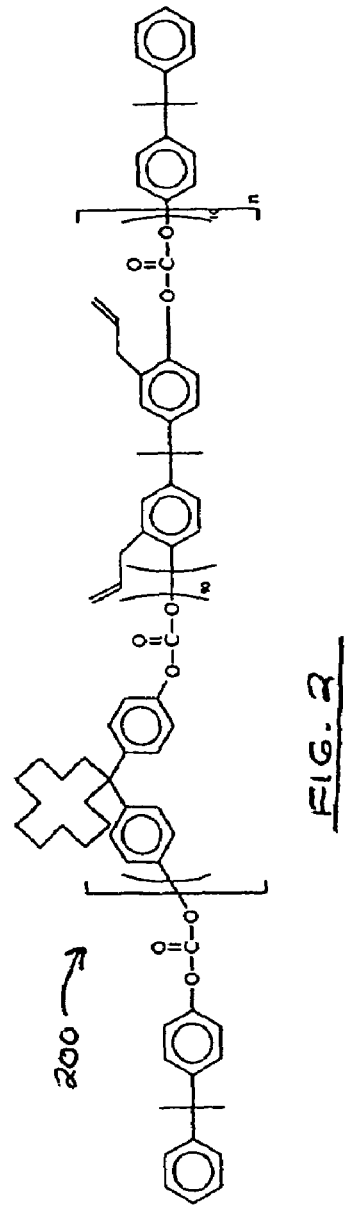
FIG. 2 shows one example of a polymer utilized to form a cross-linked film in accordance with one particular embodiment of the present invention.

Polycarbonate copolymer 200 shown in FIG. 2 was prepared by interfacial phosgenation of a mixture of the bisphenol derived from phenol and cyclododecanone, and 2,2'-diallylBPA (90:10, bis-phenol:2,2'-diallylBPA). p-cumylphenol was utilized as a chainstopper. Solutions of copolymer 200 in $CH_2Cl_2$, were prepared with and without Karstedt's catalyst $Pt_2$ $\{[(CH_2=CH)Me_2Si]_2O\}_3$ (1 μof a 9.9% "Pt" solution). A solution of a non-olefin containing copolymer, LEXAN® resin (1.0 g/10 mL) in $CH_2Cl_2$, was prepared to serve as a control. TABLE 1 below summarizes the three film types.

TABLE 1

| FILM | POLYMER | CATALYST (Karstedt Catalyst @ 9.9% Pt Solution) |
|---|---|---|
| A | 200 (of FIG. 2) | 0 μL |
| B | 200 (of FIG. 2) | 1 μL |
| C | LEXAN® | 1 μL |

Polymer films were cast from these solutions by evaporation of the solvent at room temperature. The dried films were then cured by heating from 40° C. to 270° C. @ 10° C./min, and then from 40° C. to 320° C. @ 20° C./min. Solubility of the heated films in $CH_2Cl_2$ was then determined. Solubility results are presented below in TABLE 2.

TABLE 2

| | $CH_2Cl_2$ Solubility | |
|---|---|---|
| FILM | PRE-CURE | POST-CURE |
| A | soluble | soluble |
| B | soluble | insoluble |
| C | soluble | soluble |

TABLES 1 and 2 show that after heating, only the combination of the olefin-containing polymer and the catalyst (film B) experienced cross-linking that rendered the cured film insoluble. Solubility in $CH_2Cl_2$ of the LEXAN® polymer lacking olefin groups was unchanged by the cure process.

Embodiments in accordance with the present invention offer a number of advantages over conventional cross-linked polymer systems. One advantage is the relative stability of the non-crosslinked polymers prior to their being subjected to the cross-linking reaction. Specifically, in the EXAMPLE described above, the polymer components can be pre-mixed and cast into films at ambient temperature prior to curing. The resulting uncured films remain stable and soluble for extended periods of time under these ambient conditions, but when heated above about 300° C. the mixtures are rapidly cured to afford the desired insoluble, crosslinked materials.

A second advantage of cross-linked polymer systems in accordance with the present invention is the relatively mild conditions under which cross-linking is induced. In Example 1, cross-linking between the olefin groups of the polymer chains is promoted at temperatures exceeding only about 300° C. Such temperatures are not so high as to cause reaction or decomposition of other types of molecules which may be present within the polymer mixture, such as highly conjugated dyes imparting NLO activity to a cured polymer film.

Having fully described several embodiments of the present invention, many other equivalent or alternative embodiments of the present invention will be apparent to those skilled in the art. For example, while the above description relates to cross-linking between olefin groups of a polycarbonate polymer, the invention is not limited to cross-linking between these or any other particular polymer chains. Embodiments in accordance with the present invention are also applicable to promoting cross-linking between a number of other types of polymer host materials, including but not limited to polyamides, polyimides, polyetherimides, polyethylene sulfones, polyethylene ethers, polyethylene ketones, polyesters, acrylics, polyurethanes, epoxides, polyethers, polyether sulfones, as well as copolymers or fluorinated analogues of any of the above.

Moreover, while the above description illustrate cross-linking involving an olefin group present on a side chain of the polymer backbone, this is also not required by the present invention. Alternative embodiments in accordance with the present invention could utilize a cross-linking reaction involving olefin groups present within the backbone of the main polymer chain.

And while the above description illustrates cross-linking involving olefin groups in the presence of the platinum Pt(0)-type Karstedt catalyst, embodiments in accordance with the present invention are not limited to the use of this or any other specific catalyst or catalyst family. In accordance with alternative embodiments, the cross-linking reaction between olefin groups of host polymer chains could be catalyzed by catalysts previously known to affect chemical reactions involving olefins, such catalysts including but not limited to Pt(0) sources such as Pt/C, Pt/Alumina, or ligated Pt species. Other Pt-based catalysts include Ashby's catalyst, Lamoreau catalyst, $(CH_3)_2(CH_2=CH)SiOSi(CH=CH_2)(CH_3)_2Pt$ (known also as $M^{vi}M^{vi}$-Pt, and 1,5-dimethyl 1,5-cycloctadiene Pt(II).

Embodiments in accordance with the present invention are potentially useful in a number of different possible applications. As previously mentioned, one such application is the preparation of polymer films exhibiting desirable nonlinear optical (NLO) characteristics. Such NLO polymers may be employed as waveguide core materials for electro-optical (EO) devices.

Figure 4:
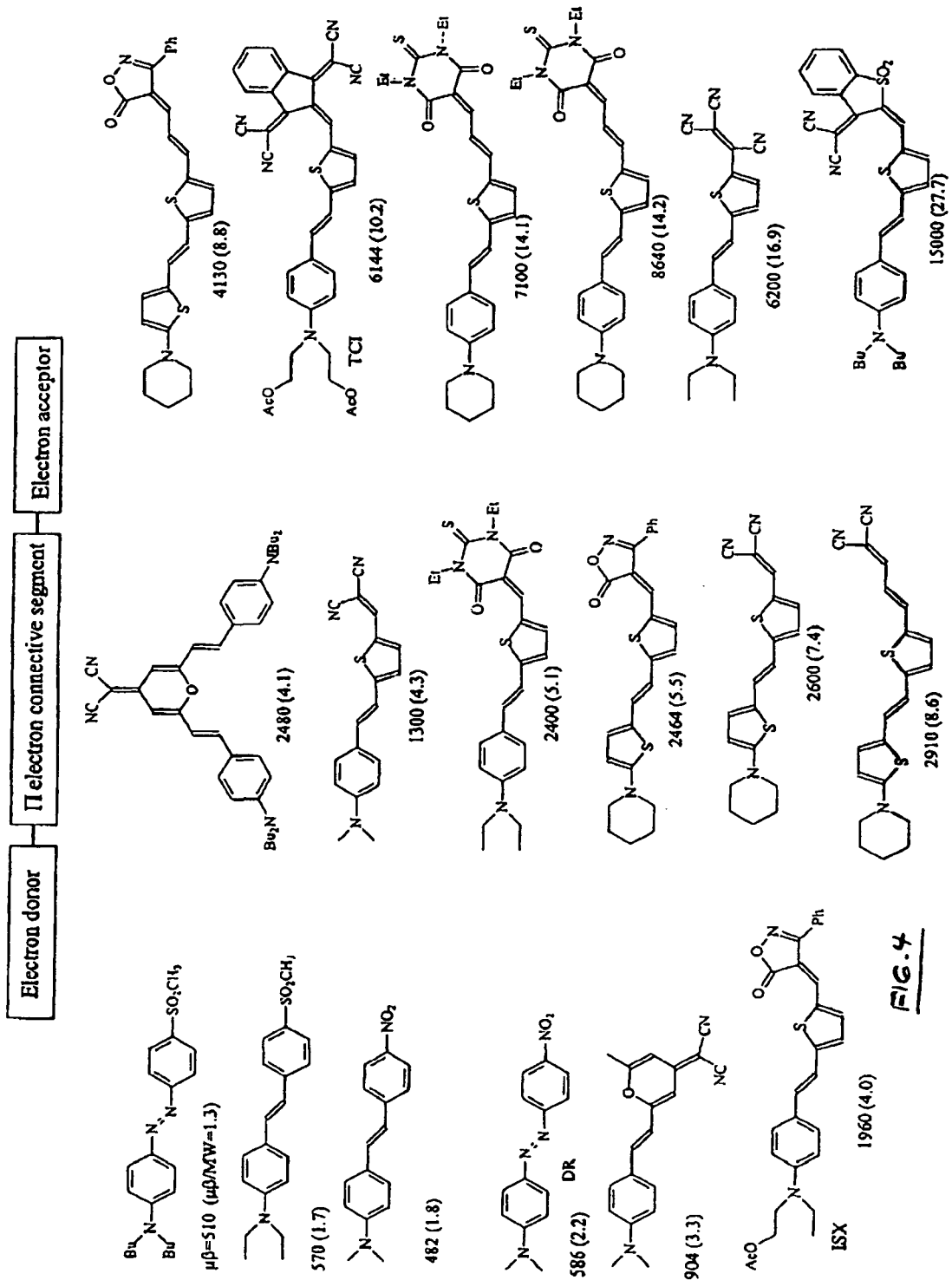
FIG. 4 presents the chemical structures of a number of NLO chromophores

Polymer systems in accordance with embodiments of the present invention could incorporate a wide variety of NLO chromophores. As shown in FIG. 4, NLO chromophores suitable for incorporation within a cross-linked polymer system in accordance with the present may be generally described as high-μB chromophores comprising an electron donor bound to a II electron connective segment that is in turn bound to an electron acceptor. Such high-μB chromophores are described, and examples given by L. R. Dalton in *Chem. Mater.*, Vol. 7, pp. 1060–1081 (1995), which is incorporated by reference herein for all purposes.

Figure 3:
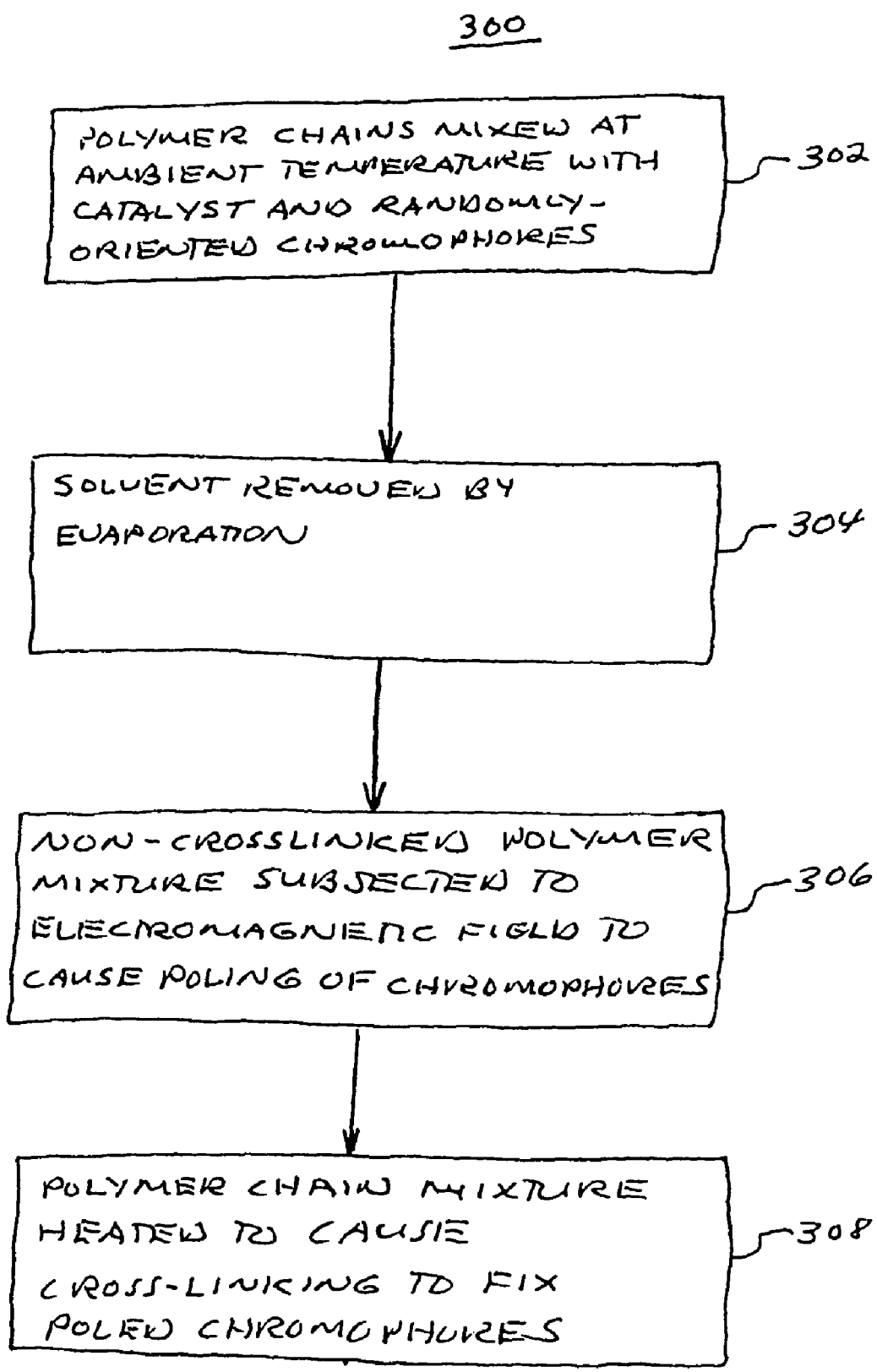
FIG. 3 is a simplified flowchart of a method of preparing a NLO chromophore polymer composite in accordance with one embodiment of the present invention.

FIG. 3 shows a simplified flow chart showing the steps of one embodiment of a method 300 for preparing a polymer exhibiting NLO properties. In first step 302, polymer chains including olefin groups are mixed at ambient temperature with a solvent, a catalyst, and a NLO-chromophore dye.

In second step 304, the solvent is removed by drying to produce a stable polymer film comprising the NLO chromophore dye distributed at random orientations throughout a non-crosslinked polymer mixture. In third step 306, the non-crosslinked polymer mixture is subjected to an electromagnetic field to cause poling of the NLO chromophore. In response to application of this electromagnetic field, the orientation of the NLO chromophores distributed throughout the non-crosslinked matrix becomes uniformly aligned relative to the direction of the applied electromagnetic field.

In fourth step 308, the mixture of polymer chains is heated to above about 300° C. to cause cross-linking in accordance with an embodiment of the present invention. As a result of this cross-linking reaction, the uniform alignment of NLO chromophore dye molecules poled in the previous step is permanently fixed, thereby endowing the cured polymer film with desired non-linear optical properties.

Possible optical-based applications for cross-linked polymer films in accordance with the present invention which incorporate chromophore dyes include, but are not limited to, Mach Zehnder modulators, optical switches, variable optical attenuators, narrowband notch and bandpass filters, digitally tuned gratings, and optical frequency mixers. Other potential optical applications for chromophore-containing cross-linked polymer films in accordance with the present invention include detecting radiation through changes in optical properties, for example as a radiation-sensitive element in an array antenna such as the design described in U.S. Pat. No. 6,252,557, incorporated by reference herein for all purposes. The compact and lightweight nature of such an array antenna may facilitate its use in extra-terrestrial applications such as in a spacecraft or satellites.

Still other applications for the compositions and methods in accordance with the present invention include fabrication of optoelectrical devices such as OLED's or photodiodes in applications where a solvent-resistant layer is desirable.

Other, nonoptical applications for cross-linked polymer systems in accordance with the present invention include use as an injection molded material or as a coating material, with on-demand cure occurring after the mixture has assumed the desired shape.

The scope of the invention should be determined with reference to the above description and the appended claims along with their full scope of equivalents.

The invention claimed is:

1. A crosslinked polymer matrix comprising:
   polymer chains including an olefin group; and
   a cross-link structure resulting from a catalyzed reaction of the olefin group at a temperature of 300° C. or greater; and
   a plurality of poled NLO chromophores fixed within the matrix.

2. The crosslinked polymer matrix of claim 1 wherein the cross-link structure connects side groups of the polymer chains.

3. The crosslinked polymer matrix of claim 1 wherein the cross-link structure connects backbones of the polymer chains.

4. The crosslinked polymer matrix of claim 1 wherein the cross-link structure connects a side group of one polymer chain to the backbone of another polymer chain.

5. The crosslinked polymer matrix of claim 1 wherein the crosslinked polymer comprises a radiation-sensitive element of an array antenna.

* * * * *